(12) United States Patent
Kanetake et al.

(10) Patent No.: US 11,331,613 B2
(45) Date of Patent: May 17, 2022

(54) CERAMIC FILTER

(71) Applicant: NGK INSULATORS, LTD., Nagoya (JP)

(72) Inventors: Takayuki Kanetake, Nagoya (JP); Shingo Tokuda, Nagoya (JP); Shuji Ueda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 17/168,515

(22) Filed: Feb. 5, 2021

(65) Prior Publication Data

US 2021/0299604 A1 Sep. 30, 2021

(30) Foreign Application Priority Data

Mar. 31, 2020 (JP) .............................. JP2020-064971

(51) Int. Cl.
*B01D 46/24* (2006.01)
*B01D 39/20* (2006.01)
*F01N 3/022* (2006.01)

(52) U.S. Cl.
CPC ..... *B01D 46/2429* (2013.01); *B01D 39/2068* (2013.01); *F01N 3/0222* (2013.01); *B01D 46/24491* (2021.08); *B01D 46/24492* (2021.08); *B01D 2239/1208* (2013.01); *B01D 2239/1216* (2013.01); *B01D 2279/30* (2013.01); *F01N 2330/02* (2013.01); *F01N 2330/06* (2013.01); *F01N 2330/30* (2013.01)

(58) Field of Classification Search
CPC .......... B01D 46/2429; B01D 46/24492; B01D 46/24491; B01D 2239/1216; B01D 46/2498; F01N 3/2022; F01N 2330/06

USPC ............................................ 55/523; 428/180
See application file for complete search history.

(56) References Cited

U.S. PATENT DOCUMENTS

| 8,637,418 | B2* | 1/2014 | Bruggendick | ....... B01J 37/0207 |
| | | | | 502/24 |
| 2002/0045541 | A1* | 4/2002 | Koike | ................... F01N 3/2828 |
| | | | | 502/251 |
| 2003/0224933 | A1* | 12/2003 | Kondo | ............... B01D 53/9454 |
| | | | | 502/439 |
| 2006/0166820 | A1* | 7/2006 | Ogyu | ................. B01D 46/2474 |
| | | | | 502/439 |
| 2007/0039297 | A1 | 2/2007 | Kawata et al. | |

(Continued)

FOREIGN PATENT DOCUMENTS

| JP | 2005-095884 A1 | 4/2005 |
| JP | 2010-138770 A1 | 6/2010 |

(Continued)

*Primary Examiner* — Tom P Duong
(74) *Attorney, Agent, or Firm* — Burr & Brown, PLLC (57) ABSTRACT

A ceramic filter having a pillar-shaped honeycomb structure, wherein when observing a plurality of pores from a surface of partition walls with a laser microscope and plotting an equivalent circle diameter (μm) of each pore on an X-axis and a pore depth (μm) of each pore on a Y-axis on a two-dimensional coordinate system, a slope of a regression line (y/x) obtained by a least squares method in a range of $20 \leq x \leq 40$ is 0 to 0.20, an average value of the pore depth of the plurality of pores is 2.5 μm to 5.0 μm, and a number density of the plurality of pores is 600/mm² to 2450/mm².

5 Claims, 2 Drawing Sheets

(56) References Cited

U.S. PATENT DOCUMENTS

| 2011/0036080 A1* | 2/2011 | Beall | B01D 46/2474 |
| | | | 60/299 |
| 2012/0240542 A1* | 9/2012 | Kikuchi | C04B 38/0009 |
| | | | 55/523 |
| 2012/0317947 A1 | 12/2012 | Okazaki | |
| 2020/0116059 A1 | 4/2020 | Ishihara | |

FOREIGN PATENT DOCUMENTS

| JP | 2019-002298 A1 | 1/2019 |
| WO | 2011/102487 A1 | 8/2011 |

* cited by examiner

CERAMIC FILTER

FIELD OF THE INVENTION

The present invention relates to a ceramic filter having a pillar-shaped honeycomb structure.

BACKGROUND OF THE INVENTION

Particulate matters (hereinafter referred to as PMs) in the exhaust gas emitted from an internal combustion engine such as a diesel engine or a gasoline engine contains soot. Soot is harmful to the human body and its emission is regulated. At present, in order to comply with exhaust gas regulations, filters typified by DPF and GPF in which the exhaust gas passes through air-permeable small-pore partition walls to filtrate PMs such as soot have been widely used.

As a filter for collecting PM, there is known a wall flow type pillar-shaped honeycomb structure, comprising a plurality of first cells extending from a first end surface to a second end surface in the height direction, opening on the first end surface and having sealing portions on the second end surface, and a plurality of second end surfaces arranged adjacent to the first cells with partition walls interposed therebetween, extending from the first end surface to the second end surface, having sealing portions on the first end surface and opening on the second end surface.

In recent years, with the tightening of exhaust gas regulations, stricter emission standards have been introduced and the regulation level have been stricter. Accordingly, high PM collection performance is required as the required performance, but at the same time, low pressure loss must be maintained. Namely, there is a demand for an exhaust gas filter that can achieve both performances at the same time. Up to now, there are known the following techniques with the aim of achieving both high PM collection performance and low pressure loss.

Patent Literature 1 (Japanese Patent Application Publication No. 2019-2298) discloses an exhaust gas purification filter, characterized in that in a pore path length distribution of partition walls for partitioning cells represented by a frequency histogram for each 10 μm pore path length of the partition walls, a cumulative frequency, which is the maximum value obtained by adding the frequencies of a total of three adjacent classes including the maximum peak frequency, is 58% or more. Further, in this literature, it is described that the measurement of the pore path length distribution is performed using the image data analyzed three-dimensionally by CT scan.

Patent Literature 2 (Japanese Patent Application Publication No. 2010-138770) discloses a ceramic filter, characterized in that when the fault planes of the partition walls of the ceramic filter are imaged at predetermined intervals by X-ray CT scan, for each fault plane obtained, a pore that exists over a plurality of fault planes and penetrates from one surface to the other surface of a partition wall is referred to as a communication pore, and the number of communication pores is measured for each fault plane to calculate the total number of the communication pores, the number of communication pores per unit volume is $7.5 \times 10^4$ pores/mm$^3$ or more.

Patent Literature 3 (WO 2011/102487) discloses a ceramic honeycomb structure comprising partition walls in which:
(a) a porosity is 55 to 80%,
(b) a median pore diameter D50 measured by a mercury intrusion method is 5 to 27 μm.
(c) an opening area ratio of pores opening on the surface is 20% or more.
(d) an area-based median opening diameter d50 is 10 to 45 μm when the pores opening on the surface are represented by an equivalent circle diameter.
(e) a pore density of pores opening on the surface having an equivalent circle diameter of 10 μm or more and less than 40 μm is 350 cells/mm$^2$ or more.
(f) a maximum value of a slope of a curve showing a cumulative pore volume with respect to a pore diameter is 1.6 or more when the pore distribution is measured by the mercury intrusion method, and
(g) a ratio D50/d50 of the median pore diameter D50 to the median opening diameter d50 is 0.65 or less.

Patent Literature 4 (Japanese Patent Application Publication No. 2005-095884) discloses a ceramic honeycomb structure, characterized in that a porosity of partition walls is 55 to 75%, an average pore diameter Da on the surface of the partition walls is 5 to 30 μm, a pore area ratio Sa on the surface of the partition walls is 10 to 30%, and when observed from a cut surface perpendicular to the surface of the partition walls, an average value La of opening length of the surface of the plurality of pores opening on the surface of the partition walls and an average value Lb of width of the plurality of pores at a depth of La from the surface of the partition walls on the cut surface have a relationship of 1.1<Lb/La<5.

In this literature, it is described that the average pore diameter Da and the area ratio Sa on the surface of the partition walls are determined by an image analyzer from images of 5 fields of view (magnification of 100, imaging field of view 1.1 mm×0.8 mm) obtained by SEM observation of the surface of the partition walls. Further, it is described that the average value La of opening length and the average value Lb of width of the pores are determined by an image analyzer from images of 5 fields of view (magnification 100 times, imaging field of view 1.1 mm×0.8 mm) obtained by SEM observation of the cut surface of the partition walls.

CITATION LIST

Patent Literature

[Patent Literature 1] Japanese Patent Application Publication No. 2019-2298
[Patent Literature 1] Japanese Patent Application Publication No. 2010-138770
[Patent Literature 1] WO 2011/102487
[Patent Literature 1] Japanese Patent Application Publication No. 2005-095884

SUMMARY OF THE INVENTION

As described above, in order to obtain a filter that achieves both high PM collection performance and low pressure loss, it has been attempted to control various parameters of the partition walls such as pore path length, porosity, pore diameter, and opening area ratio. In addition, these parameters for identifying the structure of the partition walls have been evaluated using X-ray CT scan, electron microscope, or mercury intrusion method. However, in developing a filter that achieves both high PM collection performance and low pressure loss at a high level, characterizing the structure of the partition walls based on X-ray CT scan, electron microscope or mercury intrusion method is not always the optimum method. There is still room for improvement in filter performance.

In view of the above circumstances, in one embodiment of the present invention, it is an object to provide a ceramic filter having a pillar-shaped honeycomb structure which achieves both high PM collection performance and low pressure loss by improving the structure of partition walls from a viewpoint that has not been paid attention up to now.

As a result of diligent studies to solve the above problems, the present inventors have found that an approach of observing and analyzing the surface of partition walls with a laser microscope is advantageous for characterizing the structure of the partition walls, and it is advantageous that an equivalent circle diameter of surface pore, a pore depth, and a number density of pores satisfy predetermined conditions in order to achieve both high PM collection performance and low pressure loss. The present invention has been completed based on the above findings, and is exemplified as below.

[1]

A CERAMIC FILTER having a pillar-shaped honeycomb structure comprising an outer peripheral side wall; a plurality of first cells disposed on an inner peripheral side of the outer peripheral side wall, extending from a first end surface to a second end surface, opening on the first end surface and having sealing portions on the second end surface; and a plurality of second cells disposed on the inner peripheral side of the outer peripheral side wall, extending from the first end surface to the second end surface, having sealing portions on the first end surface and opening on the second end surface, the plurality of first cells and the plurality of second cells alternately arranged adjacent to each other with porous partition walls interposed therebetween;

wherein when observing a plurality of pores from a surface of the partition walls with a laser microscope and plotting an equivalent circle diameter (μm) of each pore on an X-axis and a pore depth (μm) of each pore on a Y-axis on a two-dimensional coordinate system, a slope of a regression line (y/x) obtained by a least squares method in a range of $20 \leq x \leq 40$ is 0 to 0.20, an average value of the pore depth of the plurality of pores is 2.5 μm to 5.0 μm, and a number density of the plurality of pores is 600/mm$^2$ to 2450/mm$^2$.

[2]

The filter according to [1], wherein the slope of the regression line (y/x) is 0.08 to 0.20.

[3]

The filter according to [1] or [2], wherein an average value of the equivalent circle diameter of the plurality of pores is 7.5 μm to 14.0 μm.

[4]

The filter according to any one of [1] to [3], wherein a porosity of the partition walls is 52% to 65%.

[5]

The filter according to any one of [1] to [4], wherein an average pore diameter of the partition walls is 6.5 μm to 20 μm.

According to one embodiment of the present invention, it is possible to provide a ceramic filter having a pillar-shaped honeycomb structure that can achieve both high PM collection performance and low pressure loss.

DETAILED DESCRIPTION OF THE INVENTION

Hereinafter, embodiments of the present invention will be described in detail with reference to the drawings. It should be understood that the present invention is not limited to the following embodiments, and any change, improvement or the like of the design may be appropriately added based on ordinary knowledge of those skilled in the art without departing from the spirit of the present invention. In addition, the relationship of the thicknesses of each component in the figures is different from the actual ratio, and the thin parts are also enlarged to make the structure easier to understand, and the actual ratio of thicknesses is not reflected as it is.

(1. Filter)

In one embodiment, a filter according to the present invention is provided as a wall flow type pillar-shaped honeycomb structure, and can be used as a DPF (Diesel Particulate Filter) and a GPF (Gasoline Particulate Filter) that is attached in an exhaust gas line of a combustion device, typically an engine mounted on a vehicle, and collects soot. The filter according to the present invention can be installed in an exhaust pipe, for example.

Figure 1:
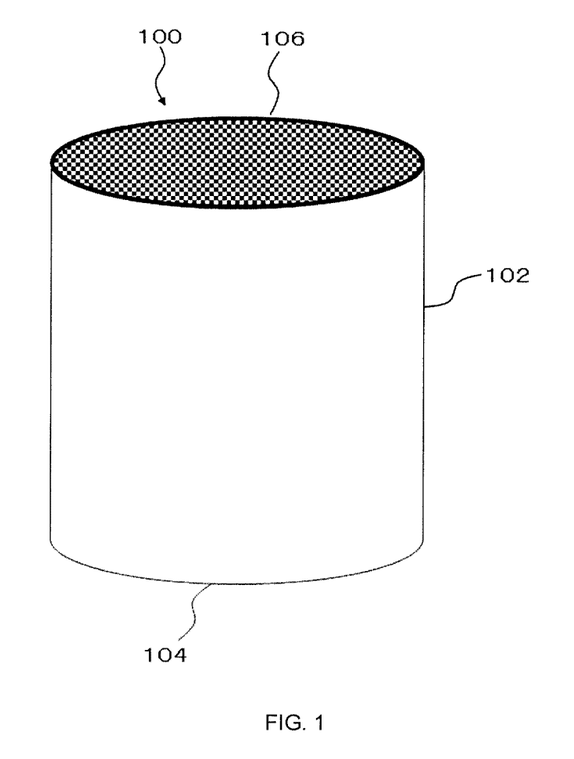
FIG. 1 is a perspective view schematically showing a wall flow type pillar-shaped honeycomb structure.
Figure 2:
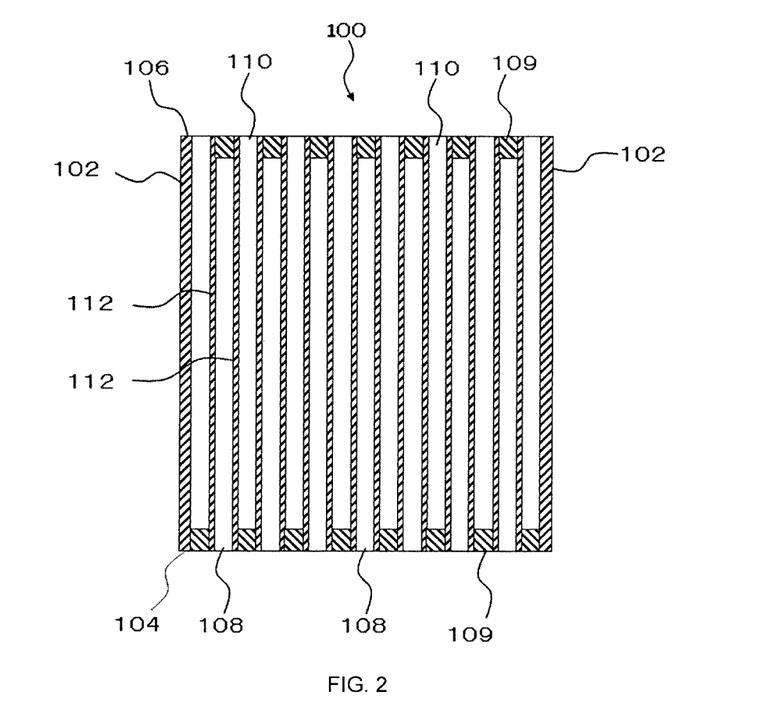
FIG. 2 is a schematic cross-sectional view of a wall flow type pillar-shaped honeycomb structure when observed from a direction orthogonal to the direction in which the cells extend.

FIGS. 1 and 2 illustrate a schematic perspective view and a cross-sectional view of a wall flow type pillar-shaped honeycomb structure (100), respectively. The pillar-shaped honeycomb structure (100) comprises an outer peripheral side wall (102); a plurality of first cells (108) disposed on an inner peripheral side of the outer peripheral side wall (102), extending from a first end surface (104) to a second end surface (106), opening on the first end surface (104) and having sealing portions (109) on the second end surface (106); and a plurality of second cells (110) disposed on the inner peripheral side of the outer peripheral side wall (102), extending from the first end surface (104) to the second end surface (106), having sealing portions (109) on the first end surface (104) and opening on the second end surface (106). In this pillar-shaped honeycomb structure (100), the plurality of first cells (108) and the plurality of second cells (110) are alternately arranged adjacent to each other with porous partition walls (112) interposed therebetween When the exhaust gas containing particulate matters (PMs) such as soot is supplied to the first end surface (104) on the upstream side of the pillar-shaped honeycomb structure (100), the exhaust gas is introduced into the first cells (108) and proceeds downstream in the first cells (108). Because the first cells (108) have the sealing portions (109) on the second end surface (106) on the downstream side, the exhaust gas passes through the porous partition walls (112) that partition the first cells (108) from the second cells (110) and flows into the second cells (110). Since the particulate matters cannot pass through the partition walls (112), it is collected and deposited in the first cells (108). After the particulate matters are removed, the cleaned exhaust gas that has flowed into the second cells (110) proceeds downstream in the second cells (110) and flows out of the second end surface (106) on the downstream side.

Examples of the ceramic constituting the pillar-shaped honeycomb structure according to the present embodiment include, but are not limited to, porous ceramic. Examples of the ceramic include cordierite, mullite, zirconium phosphate, aluminum titanate, silicon carbide, silicon-silicon carbide composite (for example, Si-bonded SiC), cordierite-silicon carbide composite, zirconia, spinel, indialite, sapphirine, corundum, titania, silicon nitride, and the like. In addition, for these ceramic, one type may be contained alone, or two or more types may be contained at the same time.

In the pillar-shaped honeycomb structure according to the present embodiment, the porous partition walls have a characteristic three-dimensional structure. The characteristic three-dimensional structure can be identified by observing the surface of the partition walls with a laser microscope. Specifically, in one embodiment of the pillar-shaped honeycomb structure, when observing a plurality of pores from the surface of the partition walls with a laser microscope and plotting an equivalent circle diameter (μm) of each pore on an X-axis and a pore depth (μm) of each pore on a Y-axis on a two-dimensional coordinate system, a slope of a regression line (y/x) obtained by a least squares method in a range of $20 \leq x \leq 40$ is 0 to 0.20, an average value of the pore depth of the plurality of pores is 2.5 μm to 5.0 μm, and the number density of the plurality of pores is $600/mm^2$ to $2450/mm^2$.

When observing the surface of the partition walls with a laser microscope, pores of various sizes can be observed. However, in the range of equivalent circle diameter of 20 μm to 40 μm, if the obtained slope of the regression line (y/x) is 0 to 0.20, it means that the depth of the pores does not get large so much even if the pore diameter gets large. That is, there are a lot of pores near the surface. The slope of the regression line (y/x) is preferably 0 to 0.18, more preferably 0 to 0.15, even more preferably 0 to 0.10, and typically can be set to 0.08 to 0.20. The range of the equivalent circle diameter of the pores for which the slope of the regression line is determined is set to 20 μm to 40 μm because the coarse pores in this range have a large effect on the PM collection efficiency.

The above regression line is calculated based on the measurement results for 10 or more samples obtained by collecting a plurality of samples of the partition walls from the pillar-shaped honeycomb structure without bias.

Figure 3:
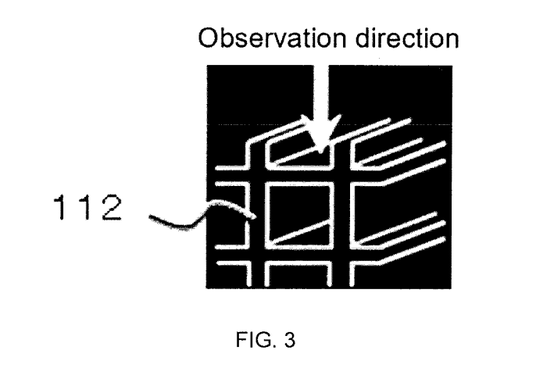
FIG. 3 is a schematic view illustrating a direction when observing the surface of a partition wall with a laser microscope.

In the present specification, the surface observation of the partition walls with a laser microscope is performed under the following conditions.
Measuring instrument name: shape analysis laser microscope (KEYENCE VK-X250/260) or a product with equivalent performance
Analysis software: multi-file analysis application (VK-1HXM) or software with equivalent performance
Objective lens magnification: 10 times
Sample size: 20 mm×20 mm×10 mm
Number of measurements: 10 times with different fields of view for one sample
Measurement mode: Surface shape
Measurement size per field of view: standard (1024 pixels× 768 pixels)
Measurement quality: high accuracy
Measurement time: 2 minutes
Leveling process: a process to designate a square area of 1000 μm×1000 μm and determine the plane (reference plane) to be used as the measurement reference is performed. The entire height data is rotated so that the set reference plane is horizontal, and offset in the height direction so that the reference plane height becomes 0.
Reference plane position: −3 μm (offset so that the position at a depth of 3 μm has a height of 0)
Ignore micro regions: yes
Number of pixels of micro region: ≥6 Pixels (surface irregularities less than 6 pixels are not recognized as a pore.)
Observation direction: Observe from the direction perpendicular to the surface of a partition wall (see FIG. 3).

For the equivalent circle diameter of each pore, when observing the surface of the partition walls under the above conditions, the opening area of each pore to be measured is measured with respect to the region where the leveling process has been performed, and the diameter of a circle having the same area is calculated.

For the pore depth of each pore, when observing the surface of the partition walls under the above conditions, the depth of the region constituting each pore to be measured is measured by irradiating a linear short-wavelength laser and measuring the depth of one point for each pixel, and the average is calculated.

From the viewpoint of preventing the particulate matters collected in the partition walls from penetrating deep into the partition walls, the upper limit of the average value of the pore depth of the plurality of pores is preferably 5.0 μm or less, more preferably 4.5 μm or less, and even more preferably 4.0 μm or less. In addition, from the viewpoint of improving the collection performance of the particulate matters, the lower limit of the average value of the pore depth of the plurality of pores is preferably 2.5 μm or more, more preferably 3.0 μm or more, and even more preferably 3.5 μm or more. The average value of the pore depth is calculated based on the measurement results for 10 or more samples obtained by collecting a plurality of samples of the partition walls from the pillar-shaped honeycomb structure without bias.

From the viewpoint of PM collection, the upper limit of the number density of the plurality of pores is preferably 2450 pores/$mm^2$ or less, and more preferably 1400 pores/$mm^2$ or less. From the viewpoint of pressure loss, the lower limit of the number density of the plurality of pores is preferably 600 pores/$mm^2$ or more, more preferably 700 pores/$mm^2$ or more, and even more preferably 800 pores/$mm^2$ or more.

The number density of pores is obtained by dividing the number of pores observed when observing the surface of the partition walls under the above conditions by the area of the measurement size. The number density of the pores is calculated based on the measurement results for 10 or more samples obtained by collecting a plurality of samples of the partition walls from the pillar-shaped honeycomb structure without bias.

Although the present invention is not intended to be limited by any theory, if the partition walls have the above-mentioned three-dimensional structure, the particulate matters collected in the partition walls can be prevented from penetrating deep into the partition walls. On the other hand, the partition walls have pores with a sufficient number density to collect particulate matters. Therefore, it is presumed that the pressure loss can be kept low while achieving high PM collection efficiency.

From the viewpoint of pressure loss, the lower limit of the average value of the equivalent circle diameter of the plurality of pores is preferably 6.5 μm or more, more preferably 7.0 μm or more, and even more preferably 7.5 μm or more. In addition, from the viewpoint of PM collection, the upper limit of the average value of the equivalent circle diameter of the plurality of pores is preferably 18.0 μm or less, more preferably 16.0 μm or less, and even more preferably 14.0 μm or less. Therefore, in a preferred embodiment, the average value of the equivalent circle diameter of the plurality of pores may be, for example, in the range of 7.5 to 14.0 μm. The average value of equivalent circle diameter of the pores is calculated based on the measurement results for 10 or more samples obtained by collecting a plurality of samples of the partition walls from the pillar-shaped honeycomb structure without bias.

The porosity of the partition walls is preferably 52% or more, more preferably 58% or more, and even more preferably 65% or more, when measured by a mercury intrusion method in accordance with JIS R1655: 2003 using a mercury porosimeter. When the porosity of the partition walls is within the above range, it is possible to suppress a drop in the pressure loss of the filter. In addition, the porosity of the partition walls is preferably 65% or less, more preferably 58% or less, and even more preferably 52% or less. When the porosity of the partition walls is within the above range, the strength can be improved and damage during canning can be suppressed. Therefore, in a preferred embodiment, the porosity of the partition walls may be, for example, in the range of 52% to 65%.

The upper limit of the average pore diameter of the partition walls is preferably 20 μm or less, more preferably 18 μm or less, and even more preferably 16 μm or less, when measured by a mercury intrusion method in accordance with JIS R1655: 2003 using a mercury porosimeter. When the average pore diameter of the partition walls is in the above range, the collection efficiency of particulate matters is significantly improved. In addition, from the viewpoint of pressure loss, the lower limit of the average pore diameter of the partition walls is preferably 6.5 μm or more, more preferably 8.0 μm or more, and even more preferably 9.0 μm or more, when measured by a mercury intrusion method in accordance with JIS R1655: 2003 using a mercury porosimeter.

The mercury intrusion method is a method in which an isostatic pressure is applied to a sample when it is immersed in mercury in a vacuum condition, and then mercury is intruded into the sample while gradually increasing the pressure, and the pore size distribution is calculated from the pressure and the volume of mercury intruded into the pores. When the pressure is gradually increased, mercury is intruded in order from the pores having larger diameter, increasing the cumulative volume of mercury, and finally when all the pores are filled with mercury, the cumulative volume reaches an equilibrium amount.

The cumulative volume at this time is the total pore volume ($cm^3/g$), and the pore diameter at the time when 50% volume of the total pore volume is intruded with mercury is defined as the average pore diameter. Further, the porosity is calculated from the volume of mercury that has entered the pores. For the average pore diameter and porosity of the partition walls, a plurality of samples of the partition walls is collected from the pillar-shaped honeycomb structure without bias, and the average value of the measurement results for 10 or more samples is used as the measured value.

From the viewpoint of increasing the strength and collection efficiency of the filter, the lower limit of the thickness of the partition walls is preferably 6 mil or more, more preferably 8 mil or more, and even more preferably 12 mil or more. In addition, from the viewpoint of suppressing the pressure loss of the filter, the upper limit of the thickness of the partition walls is preferably 12 mil or less, more preferably 8 mil or less, and even more preferably 6 mil or less. The thickness of the partition walls refers to a length at which a line segment crosses the partition wall when the center of gravity of adjacent cells are connected by the line segment in a cross-section orthogonal to the direction in which the cells extend. In addition, 1 mil is $\frac{1}{1000}$ inch, or 0.0254 mm.

A catalyst that assists PM combustion may be carried on the surface of the partition walls or inside the partition walls. The catalyst may appropriately comprise, for example, noble metals (Pt, Pd, Rh, and the like), alkali metals (Li, Na, K, Cs, and the like), alkaline earth metals (Ca, Ba, Sr, and the like), rare earths (Ce, Sm, Gd, Nd, Y, Zr, Ca, La, Pr, and the like), transition metals (Mn, Fe, Co, Ni, Cu, Zn, Sc, Ti, V, Cr, and the like) and the like.

The shape of the end surfaces of the pillar-shaped honeycomb structure is not limited, but for example, it can be a round shape such as a circular shape, an elliptical shape, a race track shape and an oval shape; a polygonal shape such as a triangular shape and a quadrangle shape. The pillar-shaped honeycomb structure (100) shown in the figures have circular end surfaces and is cylindrical as a whole.

The shape of the cells in the cross-section perpendicular to the flow path direction of the cells is not limited, but is preferably a quadrangle, a hexagon, an octagon, or a combination thereof. Among these, a quadrangle and a hexagon are preferred. By making the cell shape in this way, the pressure loss when fluid is passed through the pillar-shaped honeycomb structure is reduced.

The cell density (number of cells per unit cross-sectional area) is also not particularly limited, but for example, it may be 6 to 2000 cells/square inch (0.9 to 311 cells/$cm^2$), more preferably 50 to 1000 cells/square inch (7.8 to 155 cells/$cm^2$), particularly preferably 100 to 400 cells/square inch (15.5 to 62.0 cells/$cm^2$).

(2. Method for Manufacturing Filter)

An exemplary method for manufacturing the pillar-shaped honeycomb structure according to the present invention will be described below. First, a raw material composition comprising a ceramic raw material, a dispersion medium, a pore former and a binder is kneaded to form a green body. Then, the green body is extrusion molded to form a desired pillar-shaped honeycomb formed body. Additives such as a dispersant can be added to the raw material composition as needed. During the extrusion molding, a die having a desired overall shape, cell shape, partition wall thickness, cell density and the like can be used.

After the pillar-shaped honeycomb formed body is dried, sealing portions are formed on both end surfaces of the pillar-shaped honeycomb formed body, and then the sealing portions are dried to obtain a pillar-shaped honeycomb formed body with sealing portions. After that, the pillar-shaped honeycomb formed body is degreased and fired to prepare a pillar-shaped honeycomb structure as a fired body.

As the ceramic raw material, a raw material capable of forming the above-mentioned ceramics after firing can be used. The ceramic raw material can be provided, for example, in the form of powder. Examples of the ceramic raw material include raw materials for obtaining ceramics such as cordierite, mullite, zircon, aluminum titanate, silicon carbide, silicon nitride, zirconia, spinel, indialite, sapphirine, corundum, and titania. Specifically, examples include, but are not limited to, silica, talc, alumina, kaolin, serpentine, pyroferrite, bluesite, boehmite, mullite, magnesite, and aluminum hydroxide. As the ceramic raw material, one type may be used alone, or two or more types may be used in combination.

In the case of filter applications such as DPF and GPF, cordierite can be preferably used as the ceramic. In this case, a cordierite-forming raw material may be used as the ceramic raw material. A cordierite-forming raw material is a raw material that forms cordierite by firing. It is desirable that the cordierite-forming raw material have a chemical composition of alumina ($Al_2O_3$) (including the amount of aluminum hydroxide that is converted to alumina): 30 to 45% by mass, magnesia (MgO): 11 to 17% by mass, and silica ($SiO_2$): 42 to 57% by mass.

Further, it is preferable to blend porous silica as the ceramic raw material. Porous silica has a property of easily forming pores on the surface because it maintains its shape until the late stage of firing, and contributes to reducing the slope (y/x) of the regression line described above. Therefore, the porous silica preferably occupies 7.0 parts by mass or more, more preferably 15.0 parts by mass or more, and even more preferably 20.0 parts by mass or more in 100 parts by mass of the ceramic raw material. However, if the proportion of porous silica in the ceramic raw material is too large, it is necessary to extend the firing time for the cordierite-forming reaction, which is costly. Therefore, the porous silica preferably occupies 35.0 parts by mass or less, more preferably 30.0 parts by mass or less, and even more preferably 25.0 parts by mass or less in 100 parts by mass of the ceramic raw material. Porous silica plays a role as a pore former, but since it also constitutes the filter as a ceramic after firing, it is treated as a ceramic raw material in this specification.

In one embodiment, the porous silica is provided in the form of powder. In this case, the lower limit of the median diameter (D50) when a volume-based cumulative particle size distribution of the porous silica is obtained by a laser diffraction/scattering method is preferably 5.0 µm or more, and more preferably 10.0 µm or more. The upper limit of the median diameter (D50) is preferably 40.0 µm or less, and more preferably 30.0 µm or less, for the reason of preventing a decrease in PM collection efficiency due to an increase in large pores.

Examples of the dispersion medium include water or a mixed solvent of water and an organic solvent such as alcohol, and water can be particularly suitably used.

The pore former is not particularly limited as long as it becomes pores after firing, and examples thereof include wheat flour, starch, foamed resin, water-absorbing resin, acrylic resin, carbon (for example, graphite), ceramic balloon, polyethylene, polystyrene, polypropylene, nylon, polyester, acrylic and phenol, and the like. As the pore former, one type may be used alone, or two or more types may be used in combination. The content of the pore former is preferably 0.5 parts by mass or more, more preferably 2 parts by mass or more, and even more preferably 3 parts by mass or more with respect to 100 parts by mass of the ceramic raw material, from the viewpoint of increasing the porosity of the fired body. The content of the pore former is preferably 10 parts by mass or less, more preferably 7 parts by mass or less, and even more preferably 4 parts by mass or less with respect to 100 parts by mass of the ceramic raw material, from the viewpoint of ensuring the strength of the fired body.

Examples of the binder include organic binders such as methyl cellulose, hydroxypropyl methyl cellulose, hydroxyethyl cellulose, carboxymethyl cellulose, polyvinyl alcohol, and the like. In particular, it is suitable to use methyl cellulose and hydroxypropyl methyl cellulose in combination. Further, the content of the binder is preferably 4 parts by mass or more, more preferably 5 parts by mass or more, and even more preferably 6 parts by mass or more with respect to 100 parts by mass of the ceramic raw material, from the viewpoint of increasing the strength of the honeycomb formed body. The content of the binder is preferably 9 parts by mass or less, more preferably 8 parts by mass or less, and even more preferably 7 parts by mass or less with respect to 100 parts by mass of the ceramic raw material, from the viewpoint of suppressing the occurrence of cracking due to abnormal heat generation in the firing step. As the binder, one type may be used alone, or two or more types may be used in combination.

As the dispersant, ethylene glycol, dextrin, fatty acid soap, polyether polyol and the like may be used. As the dispersant, one type may be used alone, or two or more types may be used in combination. The content of the dispersant is preferably 0 to 2 parts by mass with respect to 100 parts by mass of the ceramic raw material.

The method for sealing the end surfaces of the pillar-shaped honeycomb formed body is not particularly limited, and a well-known method can be adopted. The material of the sealing portion is not particularly limited, but ceramic is preferable from the viewpoint of strength and heat resistance. The ceramic is preferably a ceramic material comprising at least one selected from the group consisting of cordierite, mullite, zircon, aluminum titanate, silicon carbide, silicon nitride, zirconia, spinel, indialite, sapphirine, corundum, and titania. It is even more preferable that the sealing portion have the same material composition as the main body portion of the honeycomb formed body because the expansion coefficient at the time of firing can be made the same and the durability can be improved.

A pillar-shaped honeycomb structure can be manufactured by drying the honeycomb formed body and then performing degreasing and firing. As the conditions of the drying step, the degreasing step and the firing step, known conditions may be adopted according to the material composition of the honeycomb formed body, and although no particular explanation is required, specific examples of the conditions are given below.

In the drying step, conventionally known drying methods such as hot gas drying, microwave drying, dielectric drying, reduced pressure drying, vacuum drying, and freeze drying may be used. Among these, a drying method that combines hot gas drying with microwave drying or dielectric drying is preferable in that the entire formed body can be dried quickly and uniformly. When forming the sealing portions, the sealing portions can be formed on both end surfaces of the dried honeycomb formed body, and then the sealing portions are dried to obtain a honeycomb dried body.

Next, the degreasing step will be described. The combustion temperature of the binder is about 200° C., and the combustion temperature of the pore former is about 300 to 1000° C. Therefore, the degreasing step may be carried out by heating the honeycomb formed body in the range of about 200 to 1000° C. The heating time is not particularly limited, but is usually about 10 to 100 hours. The honeycomb formed body after the degreasing step is called a calcined body.

The firing step depends on the material composition of the honeycomb formed body, but can be performed, for example, by heating the calcined body to 1350 to 1600° C. and maintaining the temperature for 3 to 10 hours.

EXAMPLES

Hereinafter, examples for better understanding the present invention and its advantages will be illustrated, but the present invention is not limited to the examples.
<Manufacture of Pillar-Shaped Honeycomb Structure>

In accordance with the test number, the main raw materials (ceramic raw materials) and auxiliary raw materials having the particle diameters shown in Table 1-1, Table 1-2, and Table 1-3 were mixed in a dispersion medium according to the blending ratios shown in Table 1-1, Table 1-2, and Table 1-3, and kneaded to prepare green bodies. The particle diameter of each raw material means the median diameter (D50) when the cumulative particle size distribution on a volume basis was obtained by a laser diffraction/scattering method using an LA-950 instrument available from HORIBA. Water was used as the dispersion medium, acrylic resin was used as the organic pore former, hydroxypropyl methylcellulose was used as the binder, and fatty acid soap was used as the dispersant. Talc A and talc B were the same material but having different particle sizes. Porous silica A, porous silica B, and porous silica C were the same material but having different particle sizes. The organic pore former A and the organic pore former B were the same material but having different particle sizes.

Each of the green bodies was charged into an extrusion molding machine and extrusion-molded to obtain a cylindrical honeycomb formed body via a die with a predetermined shape. After the obtained honeycomb formed body was subject to dielectric drying and hot-air drying, both end surfaces were cut to have predetermined dimensions, thereby obtaining a honeycomb dried body.

The specifications of the honeycomb dried body were as follows.
Overall shape: a cylindrical shape with a diameter of 70 mm×a height of 100 mm
Cell shape in a cross-section perpendicular to the flow path direction of the cells: square
Cell density (number of cells per unit cross-section area): 300 cells/inch$^2$
Partition wall thickness: 9 mil (229 μm) (nominal value based on the specifications of the die)

Each of the obtained dried honeycomb bodies were sealed with a w cordierite-forming slurry as a material so that the first cells and the second cells were alternately arranged adjacent to each other. Then, after degreasing by heating at about 200° C. to 1000° C. in an air atmosphere, and further firing at 1420° C. to 1440° C. for 5 hours in an air atmosphere, a pillar-shaped honeycomb structure according to each test example was obtained. A number of pillar-shaped honeycomb structures according to each test example were prepared as required to evaluate various characteristics.

<Analysis of Partition Wall Structure by Laser Microscope>

10 samples of the partition walls were collected from the obtained pillar-shaped honeycomb structure without bias, and the surface of the partition walls was observed using a shape analysis laser microscope (KEYENCE VK-X250/260), and the characteristics (1) to (4) were measured according to the measurement conditions described earlier. The results are shown in Table 1-1, Table 1-2, and Table 1-3.
(1) The slope of the regression line (y/x) obtained by the least squares method in the range of 20≤x≤40 when plotting an equivalent circle diameter (μm) of each pore on an X-axis and a pore depth (μm) of each pore on a Y-axis on a two-dimensional coordinate system.
(2) The average value of the pore depth of the plurality of pores.
(3) The number density of the plurality of pores.
(4) The average value of the equivalent circle diameter of the plurality of pores.

<Analysis of Partition Wall Structure by Mercury Intrusion Method>

10 samples of the partition walls were collected from the obtained pillar-shaped honeycomb structure without bias, and using a mercury porosimeter (Model Autopore 9505 available from Micrometrics), the porosity and average pore diameter of the partition walls were measured according to the measurement conditions described earlier. The results are shown in Table 1-1, Table 1-2, and Table 1-3.

<Performance Evaluation as a Filter>

From each of the obtained pillar-shaped honeycomb structures, a rectangular parallelepiped sample of 36 mm×36 mm×100 mm L was cut out, a certain amount of soot is flowed into the sample at a flow rate of 2 m/sec, and PM collection performance and pressure loss were evaluated under the condition that 1 g/L of soot was deposited in 2 to 3 hours. The results are shown in Table 1-1, Table 1-2, and Table 1-3.

The collection performance was classified into the following categories.
○ (circle): Equivalent to or better than the comparison target
Δ (triangle): Performance deterioration by 30% or less compared to the comparison target
× (cross): Performance deterioration by more than 30% compared to the comparison target The pressure loss performance was classified into the following categories.
○ (circle): Equivalent to or better than the comparison target
Δ (triangle): Performance deterioration by 30% or less compared to the comparison target
× (cross): Performance deterioration by more than 30% compared to the comparison target The comparison targets were set as Example 1 for No. 1 to 3, Example 4 for No. 4 to 8, Example 9 for No. 9 to 10, and Example 11 for No. 11 to 12.

TABLE 1-1

|  | Raw material | Particle diameter | No. 1 Example | No. 2 Comparative Example | No. 3 Comparative Example |
|---|---|---|---|---|---|
| Main raw material | Talc A | 25.0 μm | — | 40.0 parts by mass | 40.0 parts by mass |
|  | Talc B | 15.0 μm | 40.0 parts by mass | — | — |
|  | Kaolin | 5.0 μm | 19.0 parts by mass | 19.0 parts by mass | 19.0 parts by mass |
|  | Silica | 20.0 μm | 7.25 parts by mass | 12.5 parts by mass | 12.5 parts by mass |
|  | Alumina | 5.0 μm | 13.5 parts by mass | 13.5 parts by mass | 13.5 parts by mass |
|  | Aluminum hydroxide | 5.0 μm | 13.0 parts by mass | 15.0 parts by mass | 15.0 parts by mass |
|  | Porous silica A | 15.0 μm | — | — | — |
|  | Porous silica B | 20.0 μm | 7.25 parts by mass | — | — |
|  | Porous silica C | 40.0 μm | — | — | — |

TABLE 1-1-continued

| | Raw material | Particle diameter | 1 Example | 2 Comparative Example | 3 Comparative Example |
|---|---|---|---|---|---|
| Auxiliary raw material | Organic pore-former A | 20.0 μm | 0.5 parts by mass | 1.0 parts by mass | 0.5 parts by mass |
| | Organic pore-former B | 40.0 μm | — | — | 2.0 parts by mass |
| | Binder | — | 5.0 parts by mass | 5.0 parts by mass | 5.0 parts by mass |
| | Dispersant | — | 0.5 parts by mass | 0.5 parts by mass | 0.5 parts by mass |
| Chateristics | Porosity (%) | | 53.5 | 53.6 | 53.5 |
| | Average pore diameter (μm) | | 9.2 | 9.8 | 13.7 |
| | Number density of pores (pores/mm$^2$) | | 1000 | 900 | 600 |
| | Average value of equivalent circle diameter (μm) | | 10.5 | 9.8 | 13.7 |
| | Average value of pore depth (μm) | | 2.7 | 3.6 | 3.6 |
| | Slope of pore depth/equivalent circle diameter (y/x) | | 0.18 | 0.27 | 0.35 |
| Performance | PN Collection | | — | Δ (−10%) | x (−43%) |
| | Pressure loss | | — | x (−34%) | ○ |
| | | | Comparison target | Comparison with Example 1 | |

TABLE 1-2

| | Raw material | Particle diameter | 4 Example | 5 Example | 6 Comparative Example | 7 Example | 8 Comparative Example |
|---|---|---|---|---|---|---|---|
| Main raw material | Talc A | 25.0 μm | — | — | 40.0 parts by mass | — | — |
| | Talc B | 15.0 μm | 40.0 parts by mass | 40.0 parts by mass | — | 40.0 parts by mass | 40.0 parts by mass |
| | Kaolin | 5.0 μm | 18.5 parts by mass | 18.5 parts by mass | 19.0 parts by mass | — | 19.0 parts by mass |
| | Silica | 20.0 μm | — | — | 12.5 parts by mass | 12.5 parts by mass | 13.5 parts by mass |
| | Alumina | 5.0 μm | 13.5 parts by mass | 13.5 parts by mass | 13.5 parts by mass | 13.5 parts by mass | 13.5 parts by mass |
| | Aluminum hydroxide | 5.0 μm | 13.5 parts by mass | 13.5 parts by mass | 15.0 parts by mass | 14.0 parts by mass | 14.0 parts by mass |
| | Porous silica A | 15.0 μm | — | 14.5 parts by mass | — | — | — |
| | Porous silica B | 20.0 μm | 14.5 parts by mass | — | — | 20.0 parts by mass | — |
| | Porous silica C | 40.0 μm | — | — | — | — | — |
| Auxiliary raw material | Organic pore-former A | 20.0 μm | 1.0 parts by mass | 1.0 parts by mass | 0.5 parts by mass | 1.0 parts by mass | 0.5 parts by mass |
| | Organic pore-former B | 40.0 μm | — | — | 5.0 parts by mass | — | 5.0 parts by mass |
| | Binder | — | 5.0 parts by mass | 5.0 parts by mass | 5.0 parts by mass | 5.0 parts by mass | 5.0 parts by mass |
| | Dispersant | — | 0.5 parts by mass | 0.5 parts by mass | 0.5 parts by mass | 0.5 parts by mass | 0.5 parts by mass |
| Chateristics | Porosity (%) | | 57.5 | 56.5 | 56.7 | 60.2 | 58.4 |
| | Average pore diameter (μm) | | 9.5 | 6.5 | 13.7 | 10.1 | 9.5 |
| | Number density of pores (pores/mm$^2$) | | 1130 | 2450 | 550 | 1250 | 890 |
| | Average value of equivalent circle diameter (μm) | | 9.6 | 7.6 | 13.2 | 10.9 | 9.7 |
| | Average value of pore depth (μm) | | 3.2 | 3.0 | 3.7 | 2.6 | 2.8 |
| | Slope of pore depth/equivalent circle diameter (y/x) | | 0.13 | 0.09 | 0.28 | 0.08 | 0.24 |
| Performance | PN Collection | | — | ○ | x (−34%) | ○ | Δ (−18%) |
| | Pressure loss | | — | Δ (−13%) | ○ | Δ (−6%) | x (−38%) |
| | | | Comparison target | Comparison with Example 4 | | | |

TABLE 1-3

| | | | No. | | | |
|---|---|---|---|---|---|---|
| | Raw material | Particle diameter | 9 Example | 10 Comparative Example | 11 Example | 12 Comparative Example |
| Main raw material | Talc A | 25.0 μm | 40.0 parts by mass | 40.0 parts by mass | — | — |
| | Talc B | 15.0 μm | — | — | 40.0 parts by mass | 40.0 parts by mass |
| | Kaolin | 5.0 μm | 19.5 parts by mass | 19.0 parts by mass | 19.0 parts by mass | 19.0 parts by mass |
| | Silica | 20.0 μm | — | 13.0 parts by mass | — | 13.0 parts by mass |
| | Alumina | 5.0 μm | 13.5 parts by mass | 13.5 parts by mass | 13.5 parts by mass | 13.5 parts by mass |
| | Aluminum hydroxide | 5.0 μm | 13.5 parts by mass | 14.5 parts by mass | 14.0 parts by mass | 14.5 parts by mass |
| | Porous silica A | 15.0 μm | — | — | — | — |
| | Porous silica B | 20.0 μm | — | — | — | — |
| | Porous silica C | 40.0 μm | 13.5 parts by mass | — | 13.5 parts by mass | — |
| Auxiliary raw material | Organic pore-former A | 20.0 μm | 1.0 parts by mass | 0.5 parts by mass | 1.0 parts by mass | 0.5 parts by mass |
| | Organic pore-former B | 40.0 μm | — | 10.0 parts by mass | — | 10.0 parts by mass |
| | Binder | — | 5.0 parts by mass | 5.0 parts by mass | 5.0 parts by mass | 5.0 parts by mass |
| | Dispersant | — | 0.5 parts by mass | 0.5 parts by mass | 0.5 parts by mass | 0.5 parts by mass |
| Chateristics | Porosity (%) | | 64.0 | 64.3 | 65.3 | 65.0 |
| | Average pore diameter (μm) | | 17.7 | 21.0 | 14.4 | 15.6 |
| | Number density of pores (pores/mm$^2$) | | 600 | 520 | 700 | 550 |
| | Average value of equivalent circle diameter (μm) | | 14.1 | 11.3 | 14.0 | 10.6 |
| | Average value of pore depth (μm) | | 4.9 | 3.4 | 4.5 | 2.5 |
| | Slope of pore depth/equivalent circle diameter (y/x) | | 0.10 | 0.51 | 0.20 | 0.32 |
| Performance | PN Collection | | — | x (−48%) | — | x (−39%) |
| | Pressure loss | | — | x (−32%) | — | x (−48%) |
| | | | Comparison target | Comparison with Example 9 | Comparison target | Comparison with Example 11 |

DESCRIPTION OF REFERENCE NUMERALS

100 Pillar-shaped honeycomb structure
102 Outer peripheral side wall
104 First end surface
106 Second end surface
108 First cell
109 Sealing portion
110 Second cell
112 Partition wall

The invention claimed is:

1. A ceramic filter having a pillar-shaped honeycomb structure comprising an outer peripheral side wall; a plurality of first cells disposed on an inner peripheral side of the outer peripheral side wall, extending from a first end surface to a second end surface, opening on the first end surface and having sealing portions on the second end surface; and a plurality of second cells disposed on the inner peripheral side of the outer peripheral side wall, extending from the first end surface to the second end surface, having sealing portions on the first end surface and opening on the second end surface, the plurality of first cells and the plurality of second cells alternately arranged adjacent to each other with porous partition walls interposed therebetween;
wherein when observing a plurality of pores from a surface of the partition walls with a laser microscope and plotting an equivalent circle diameter (μm) of each pore on an X-axis and a pore depth (μm) of each pore on a Y-axis on a two-dimensional coordinate system, a slope of a regression line (y/x) obtained by a least squares method in a range of $20 \leq x \leq 40$ is 0 to 0.20, an average value of the pore depth of the plurality of pores is 2.5 μm to 5.0 μm, and a number density of the plurality of pores is 600/mm$^2$ to 2450/mm$^2$.

2. The filter according to claim 1, wherein the slope of the regression line (y/x) is 0.08 to 0.20.

3. The filter according to claim 1, wherein an average value of the equivalent circle diameter of the plurality of pores is 7.5 μm to 14.0 μm.

4. The filter according to claim 1, wherein a porosity of the partition walls is 52% to 65%.

5. The filter according to claim 1, wherein an average pore diameter of the partition walls is 6.5 μm to 20 μm.

* * * * *